US006992860B2

(12) United States Patent
Nakanishi et al.

(10) Patent No.: US 6,992,860 B2
(45) Date of Patent: Jan. 31, 2006

(54) RECORDING/REPRODUCING SEPARATED MAGNETIC HEAD WITH CONCAVE PORTION FORMED IN AIR BEARING PROTECTIVE FILM

(75) Inventors: Eiji Nakanishi, Minamiashigara (JP); Yukihiro Isono, Hadano (JP); Shigeru Tadokoro, Odawara (JP); Sunao Yonekawa, Odawara (JP); Tetsuya Matsusaki, Odawara (JP); Masao Matsushita, Oiso (JP)

(73) Assignee: Hitachi, Ltd., Tokyo (JP)

( * ) Notice: Subject to any disclaimer, the term of this patent is extended or adjusted under 35 U.S.C. 154(b) by 159 days.

(21) Appl. No.: 10/372,406

(22) Filed: Feb. 25, 2003

(65) Prior Publication Data

US 2004/0037012 A1 Feb. 26, 2004

(30) Foreign Application Priority Data

Aug. 20, 2002 (JP) ....................................... 2002-239059

(51) Int. Cl.
*G11B 5/60* (2006.01)

(52) U.S. Cl. .................. 360/236.5; 360/122; 360/235.7

(58) Field of Classification Search ............. 360/235.7, 360/236.5

See application file for complete search history.

(56) References Cited

U.S. PATENT DOCUMENTS 5,978,176 A * 11/1999 Ezaki et al. ............. 360/236.5
6,396,663 B1 * 5/2002 Kasamatsu ............... 360/235.8
2002/0109942 A1 * 8/2002 Otsuka .................... 360/235.7

FOREIGN PATENT DOCUMENTS

JP 04-366408 12/1992
JP 04-368408 12/1992

OTHER PUBLICATIONS

IEEE Transactions On Magnetics, vol. 38, No. 1, Jan. 2002, pps. 101–106, PUST, et a. "Thermomechianical Head Performance".

* cited by examiner

*Primary Examiner*—A. J. Heinz
(74) *Attorney, Agent, or Firm*—Antonelli, Terry, Stout and Kraus, LLP

(57) ABSTRACT

Protrusion of head elements to an air bearing surface is effectively reduced and their contact with a recording medium is thereby prevented by forming a level gap (concave) of about 3 nm in a multilayered protective film on the air bearing surface in a part matching an inductive write thin film head in a recording/reproducing separated type magnetic head and thereby offsetting protrusion of the head elements to the air bearing surface due to thermal deformation of the heads.

22 Claims, 7 Drawing Sheets

RECORDING/REPRODUCING SEPARATED MAGNETIC HEAD WITH CONCAVE PORTION FORMED IN AIR BEARING PROTECTIVE FILM

BACKGROUND OF THE INVENTION

1. Field of the Invention

The present invention relates to a recording/reproducing separated type magnetic head for use in magnetic disk apparatuses.

2. Description of the Prior Art

Along with the capacity enlargement of magnetic disk apparatuses, the requirement for higher recording density is increasing year after year. The apparatuses are also required to be smaller. To meet these requirements, state-of-the-art magnetic disk apparatuses use a giant magnetoresistive (GMR) head to perform the reproducing function of the recording/reproducing separated type magnetic head, with their recording track width being reduced to 0.3 μm and the gap between the head and the recording medium (hereinafter referred to as the flying height), to 13 nm, both approximately.

In order to achieve a high density of recording, the heads indispensably need to be lowered in flying height. However, along with the lowering of the flying height, the deformation of heads due to heat generation of coils in the inductive write thin film head during recording is posing an increasingly serious problem, because the deformation of heads would invite localized protrusion of the air bearing surfaces of the heads by about 3 nm and the consequent narrowing of the gap between the heads and the recording medium to about 10 nm, leading to possible collision of the heads and the recording medium, which would make head positioning impossible and in the worst case result in signal disappearance due to damaging of the recording medium or sliding of the heads. Studies on this problem include, for instance, what is reported in the IEEE Transactions on Magnetics, VOL. 38. NO.1, JANUARY 2002, pp 101.

FIG. 6 shows a schematic sectional view of a recording/reproducing separated type magnetic head using a GMR head. FIG. 7 and FIG. 8 respectively show thermal deformation of a head and how a head is worn by its contact with a recording medium. When heated, a head is deformed in such a way that its angled portion (the upper end of a protective film 13) protrudes forward with a substrate 1 as the base point. As a result, the protruding part of a multilayered protective film 19 on the air bearing surface comes into contact with the recording medium, and an area A is worn as shown in FIG. 8. The quantity of wear is defined by the width (w), height (h) and depth (d). According to the evaluation of a head whose flying height was approximately 0, the depth (d), width (w) and height (h) of the wear of the multilayered protective film 19 on the air bearing surface over an upper magnetic film 12 were 3 nm, 8 μm and 5 μm, respectively, at a recording frequency of 300 MHz, a write current of 50 mA and an ambient temperature of 60° C. even in a head improved in thermal protrusion (TPR) whose distance from the rear part of the upper magnetic film 12 to an air bearing surface shallow groove 14 was narrowed to 4 um or less as shown in FIG. 7. Thus, the wear of the multilayered protective film 19 on the air bearing surface over the upper magnetic film 12 due to the deformation of the head is too substantial to ignore. The wear depth of 3 nm accounts for 23% of the flying height of 13 nm between the head and the recording medium. This percentage corresponds to the 3.5-nm-thickness of the carbon film C of the multilayered protective film 19 on the air bearing surface.

A head can be deformed by differences among its constituent layers in the ratio of expansion when the head is heated. The heating of the head in turn would be due to its ambient temperature or its own heat generation. Among the factors of ambient temperature, the temperature within the magnetic disk apparatus is dominant. Many magnetic disk apparatuses are guaranteed against a temperature of about 60° C. The self-generated heat of the head mainly derives from Joule heating due to the electrification of coils at the time of writing, eddy current heating in the high frequency region, iron loss and an increase in resistance by the skin effect.

Deformation can be reduced by lowering the head temperature, the ambient temperature among various temperature elements is specified by the customer, and the manufacturer has to configure a structure that can meet the customer's requirement. On the other hand, to reduce the self-generated heat of heads, effective ways include reducing the resistance of coils, shaping the magnetic film compactly and using high-resistance magnetic materials. It is effective as well to reduce the volumic proportion of a material with a big difference in thermal expansion coefficient. More specifically, it is advisable to reduce the size of metallic films having a high thermal expansion coefficient, for instance, upper and lower shield films. Further, it is also effective to enhance the heat radiation effect. This can be achieved by providing a radiator plate near the source of heat. However, though the deformation of the head can be restrained to some extent by these means, deformation still occur as long as there are differences in thermal expansion coefficient among the constituent members, and it is impossible to completely eliminate contact between the head and the magnetic disk.

SUMMARY OF THE INVENTION

An object of the present invention is to provide a highly sliding resistance reliability of recording/reproducing separated type magnetic head by preventing the head coming into contact with a recording medium, which arises with the deformation of the head and with a decrease in the flying height of the head, which is an indispensable requirement for high density recording.

The object stated above can be achieved by providing a level gap on the air bearing surface of an inductive write thin film head and the air bearing surface of a read GMR head with a protective film, forming the air bearing surface of the inductive write thin film head, which is subject to deformation by heat generation, in a concave shape in advance (forming a first concave), and thereby preventing the air bearing surface of the inductive write thin film head, which is subject to deformation by heat generation, from protruding through the air bearing surface of the read GMR head.

Thus, by removing only the carbon film of the multilayered protective film on the air bearing surface in a wear-susceptible area A of a recording/reproducing separated type magnetic head to form a concave air bearing surface of about 3.5 nm in depth in advance, it is possible to provide a highly reliable recording/reproducing separated type magnetic head that can avoid contact with the recording medium even when heated by the use. A similar effect can be achieved by totally removing the multilayered protective film on the air bearing surface of the recording/reproducing separated type magnetic head in the part matching the inductive write thin film head to form a concave.

DETAILED DESCRIPTION OF PREFERRED EMBODIMENTS

Figure 1:
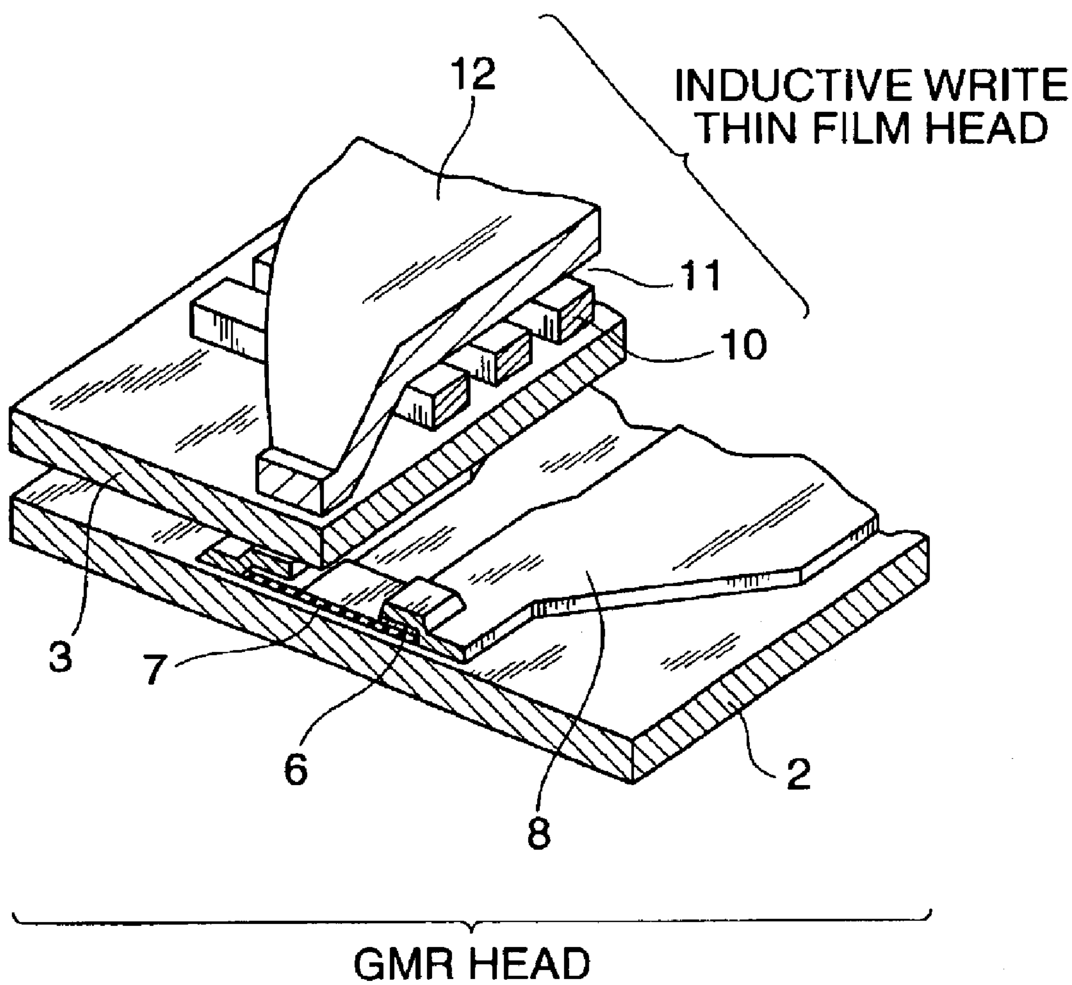
FIG. 1 shows a perspective view of a recording/reproducing separated type magnetic head to which the present invention is applied.
Figure 2:
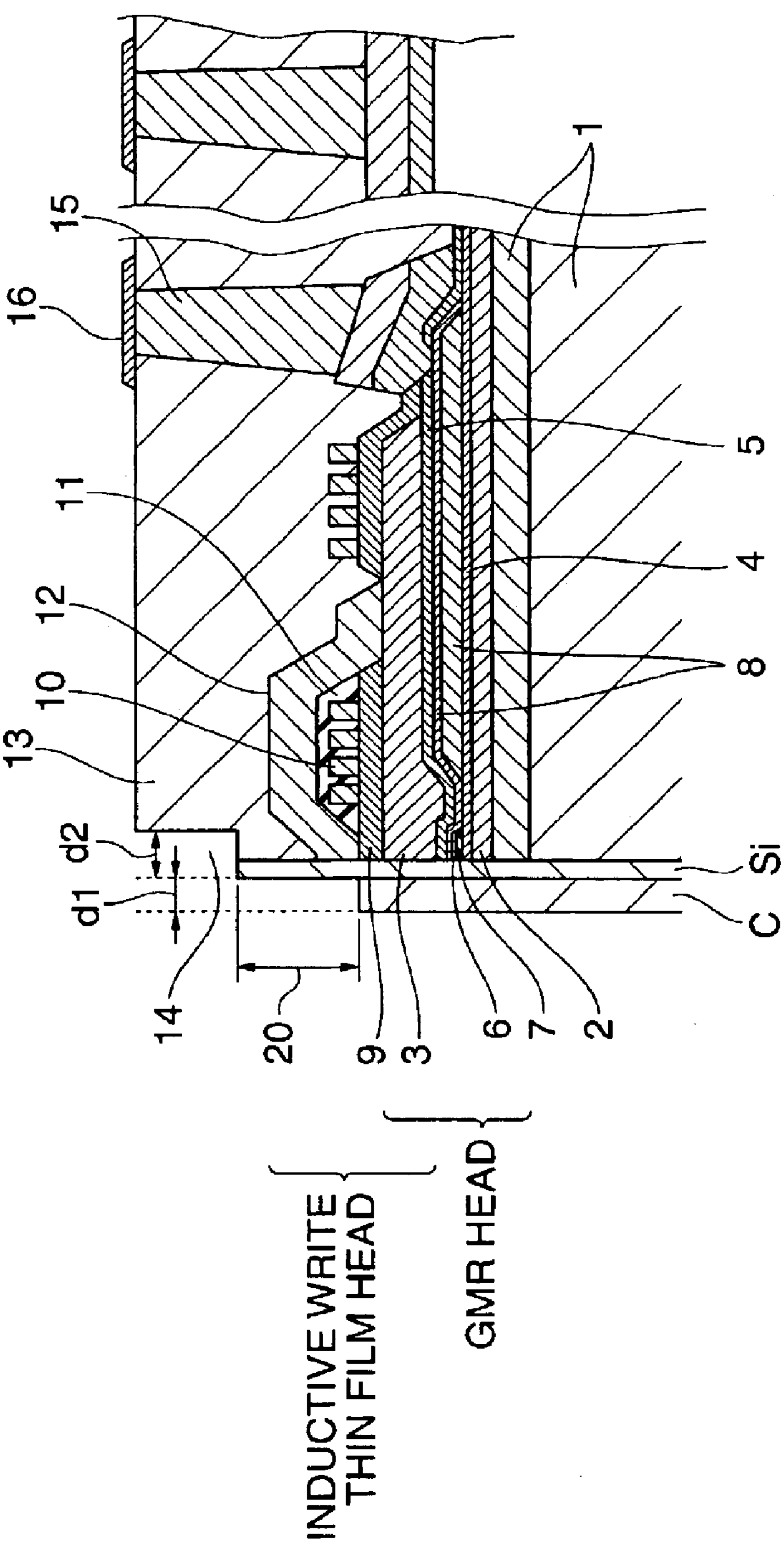
FIG. 2 shows a section of a recording/reproducing separated type magnetic head, which is a preferred embodiment of the invention.

FIG. 1 shows a perspective view of a recording/reproducing separated type magnetic head to which the present invention is applied, though the illustration of its multilayered protective film on the air bearing surface is dispensed with. FIG. 2 shows the sectional structure of a recording/reproducing separated type magnetic head, which is a first preferred embodiment of the invention, before it is heated. The recording/reproducing separated type magnetic head has a structure in which an inductive write thin film head is stacked over a giant magnetoresistive (GMR) head solely for reading use.

The read GMR head is configured by stacking over a substrate 1 a lower shield film 2, a lower gap film 4, a magnetoresistive film (GMR film) 7 for detecting signals, a hard bias film 6 for controlling the domain in the end portion of the GMR film 7, an electrode film 8 for flowing an electric current to the GMR film 7, an upper gap film 5, an upper shield film-cum-lower magnetic film 3 and so forth. On the other hand, the inductive write thin film head uses the upper shield of the GMR head also as the lower magnetic film, and is configured by stacking over this upper shield film-cum-lower magnetic film 3 a write gap film 9, coils 10, an insulating layer 11, an upper magnetic film 12 and so on. Over the inductive write thin film head is stacked a protective film 13. Further, over the air bearing surface is formed a multilayered protective film 19 on the air bearing surface by stacking a silicon film Si and a carbon film C by sputtering or otherwise. The silicon film Si is a layer in tight contact with the carbon film C.

The multilayered protective film 19 on the air bearing surface is formed for the purpose of preventing the read GMR head from corrosion and discharge, of which the silicon film Si is about 1.5 nm and the carbon film C, about 3.5 nm. In the upper end portion of the protective film 13 is formed an air bearing surface shallow groove 14 (second concave) d2. Further by removing the part of the carbon film C in what will constitute a C film-removed area 20 from the multilayered protective film 19 on the air bearing surface, a protective film level gap (first concave) d1 of a depth corresponding to the thickness of the carbon film C (about 3.5 nm) is formed in the air bearing surface matching the upper magnetic film 12 of the inductive write thin film head. Incidentally, the second concave d2 can be dispensed with.

Figure 3:
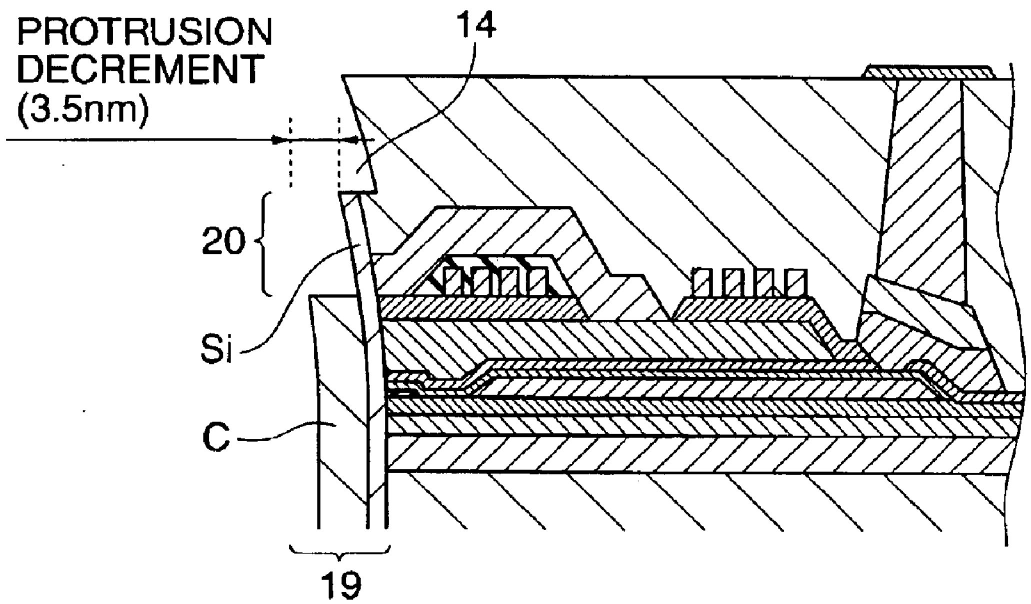
FIG. 3 shows a sectional view of the deformation of the recording/reproducing separated type magnetic head embodying the invention when under the influence of heating.

FIG. 3 shows how the recording/reproducing separated type magnetic head embodying the invention is deformed when under the influence of heating. By forming the protective film level gap d1, the protrusion of the upper end portion of the head can be reduced by about 3.5 nm. It is thereby made possible to avert contact or collision between the recording/reproducing separated type magnetic head and the recording medium. Further by properly aligning the C film-removed area 20 and distributing the thicknesses of the carbon film C and the silicon film Si over the multilayered protective film 19 on the air bearing surface, the protrusion of the angled portion of the head can be further restrained.

A number of methods are available for the formation of the level gap of the multilayered protective film 19 on the air bearing surface. A first method to form the level gap is, in the process of floating rail formation for the head, to mask other parts than the C film-removed area 20 with a resist (masking material), etch the exposed portion with oxygen (RIE) and remove the carbon film C while leaving the silicon film Si. A second method is to remove the carbon film C by reactive ion etching (RIE) with oxygen after forming a mask as in the first method, then remove the silicon film Si as well with CF4 reactive gas, and finally remove the whole multilayered protective film 19 on the air bearing surface. A third method is to form the whole air bearing surface protective film 19 of a carbon film C, and then remove the air bearing surface protective film 19 in the same way as described above. The last two methods require consideration of possible adverse impacts, such as damage or corrosion, on the surface of the upper magnetic film 12 which becomes exposed on the air bearing surface. No particular exactness is required for the depth of this protective film level gap d1, which may be 3 to 5 nm.

Next will be described in detail a manufacturing method for the recording/reproducing separated type magnetic head embodying the invention with reference to FIG. 2 and FIG. 4. First, reference is made to FIG. 2.

(1) The substrate 1 is formed in a wafer shape by stacking an $Al_2O_3$ film (base alumina) over sintered $Al_2O_3$.TiC (alumina titanium carbide) by sputtering. The lower shield film 2 is formed over this substrate 1 by plating. The lower shield film 2 is an NiFe alloy film of 2 $\mu$m in thickness.

(2) Next, the lower gap film 4 is formed of $Al_2O_3$ (alumina) by sputtering to a thickness of 0.05 $\mu$m. After that, it is processed into a desired shape by photolithography and ion milling.

(3) Then, the GMR film 7 is formed by sputtering, and processed into a desired shape by photolithography and ion milling. The GMR film 7 is a spin valve film having a CoFe free layer.

(4) Next, the hard bias film 6 and the electrode film 8 are formed by sputtering. Patterning is done by a lift-off method. The hard bias film 6 is a CoPt film. The electrode film 8 is a laminated layer of Ta and a thin film of its alloy.

(5) Then, the upper gap film 5 is formed of $Al_2O_3$ (alumina) by sputtering to a thickness of 0.05 $\mu$m. After that, it is processed into a desired shape by photolithography and ion milling.

(6) Further the upper shield film-cum-lower magnetic film 3 is formed an NiFe alloy film by plating to a thickness of 2 μm.

The formation of the read GMR head is now completed.

Then, the inductive write thin film head is stacked over the read GMR head.

(7) The write gap film 9 is formed of $Al_2O_3$ (alumina) to a thickness of 0.2 μm by sputtering over the upper shield film-cum-lower magnetic film 3.

(8) Then, the coil 10 is formed of Cu by plating. The number of turns of the coil 10 is nine.

(9) Next, the insulating layer 11 is formed by coating with a photoresist followed by heat treatment to a thickness of 10 μm.

(10) Then, the upper magnetic film 12 is formed of NiFeCo by plating.

(11) Next, a lower terminal 15 is formed of Cu by plating to be electrically connected to the electrode film 8.

(12) Next, the protective film 13 is formed of $Al_2O_3$ (alumina) to a thickness of 60 μm by sputtering.

(13) Then, the protective film 13 is lapped to expose the lower terminal 15, over which an upper terminal 16 is formed of Au to a thickness of 6 μm by plating.

The formation of the read head and the write head is now completed.

This is followed by the formation of the multilayered protective film 19 on the air bearing surface, and the level gap d2 is formed in the protective film 13 by shaped rail (SR) machining, and the level gap d1, in the multilayered protective film 19 on the air bearing surface.

Figure 4A:
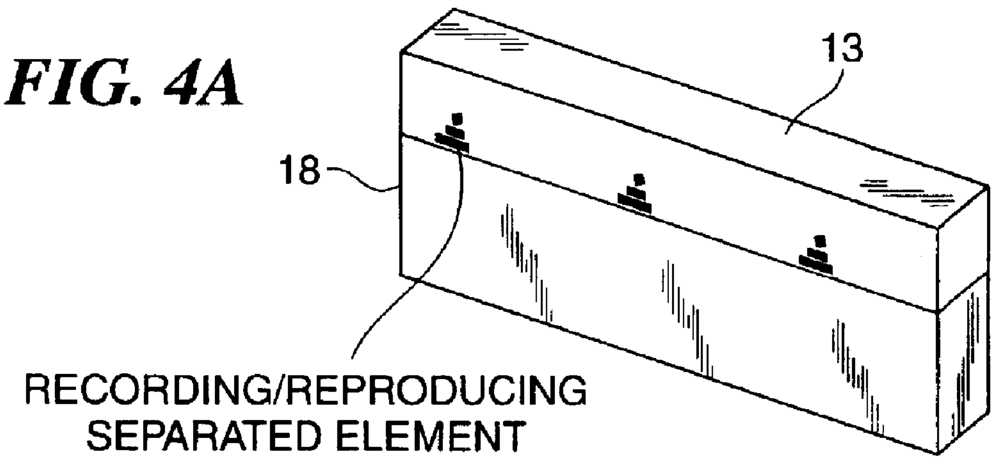
FIGS. 4A to 4C constitute a process diagram showing the method forming a level gap portion of the multilayered protective film on the air bearing surface of the recording/reproducing separated type magnetic head embodying the invention.

(14) As shown in FIG. 4A, a bar block 18 is cut out of the wafer-shaped substrate 1.

Figure 4B:
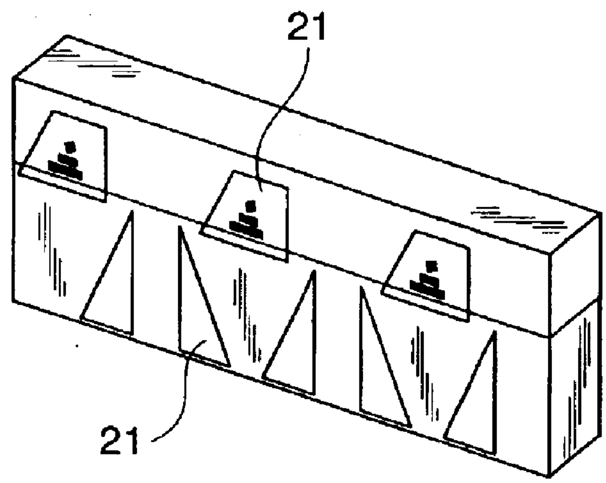

(15) Next, as shown in FIG. 4B, rails 21 are formed in the air bearing surface in the state of the bar block 18. First the multilayered film 19 of a silicon film Si and a carbon film C on the element face side of the bar block 18 is formed, followed by the formation of the rails 21 and the second concave d2 for floating by photolithography and ion milling.

Figure 4C:
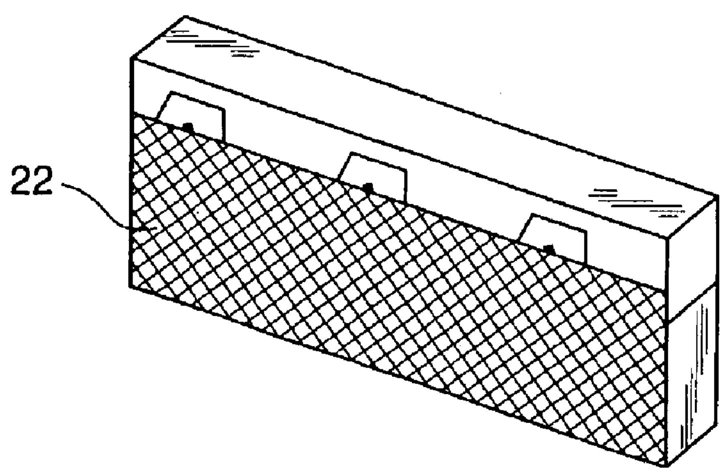

(16) Then, as shown in FIG. 4C, to remove the carbon film C of the multilayered protective film 19 on the air bearing surface in the part matching the upper magnetic film 12, the other area than the C film-removed area 20 is masked with a resist (masking material) 22. In this state, the C film-removed area 20 is subjected to RIE with oxygen, and the carbon film C is removed, with the silicon film Si serving as the stopper film. The etched quantity is about 3.5 nm, corresponding to the thickness of the carbon film C of the multilayered protective film 19 on the air bearing surface.

(17) By removing the resist (masking material) 22 after that, the level gap (first concave) d1 of the air bearing surface protective film is formed as shown in FIG. 1.

(18) By cutting this bar block 18 into chips, the recording/reproducing separated type magnetic head, which is this first embodiment of the invention, is completed.

Figure 5:
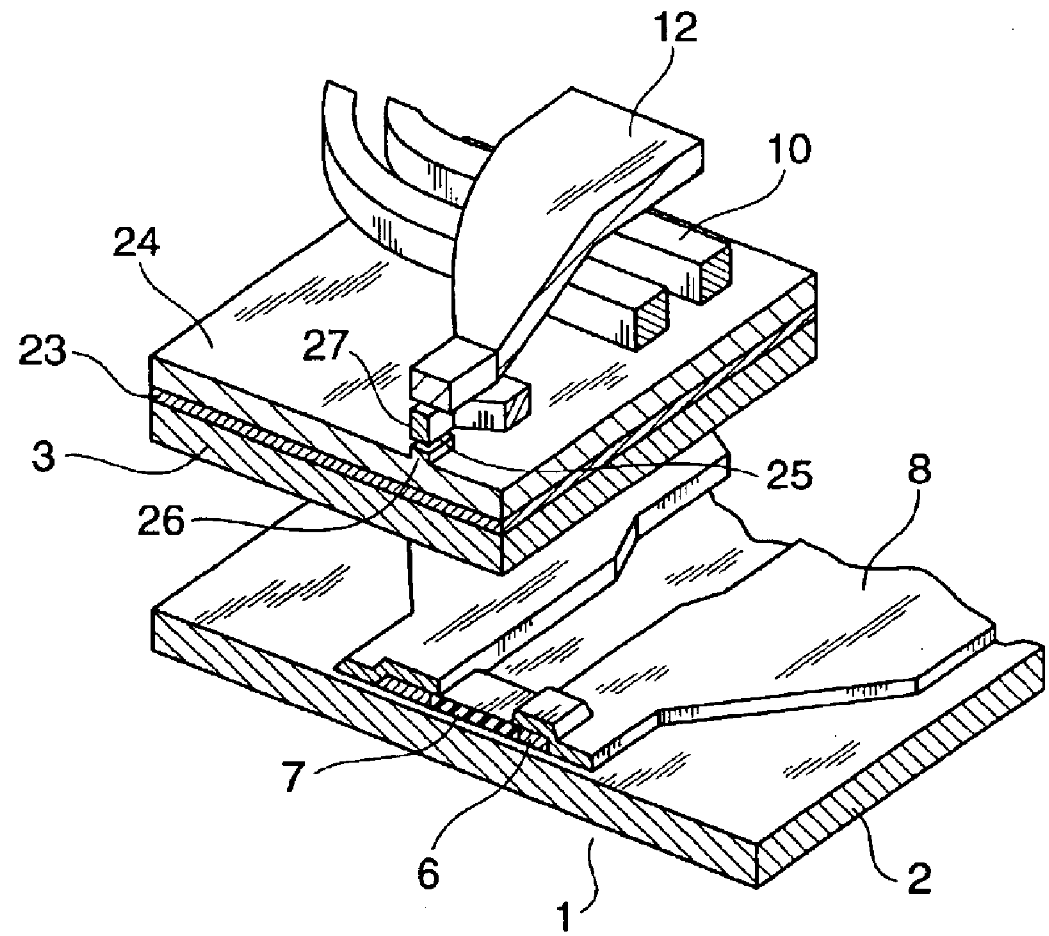
FIG. 5 shows a perspective view of a recording/reproducing separated type magnetic head, which is another preferred embodiment of the invention.
Figure 6:
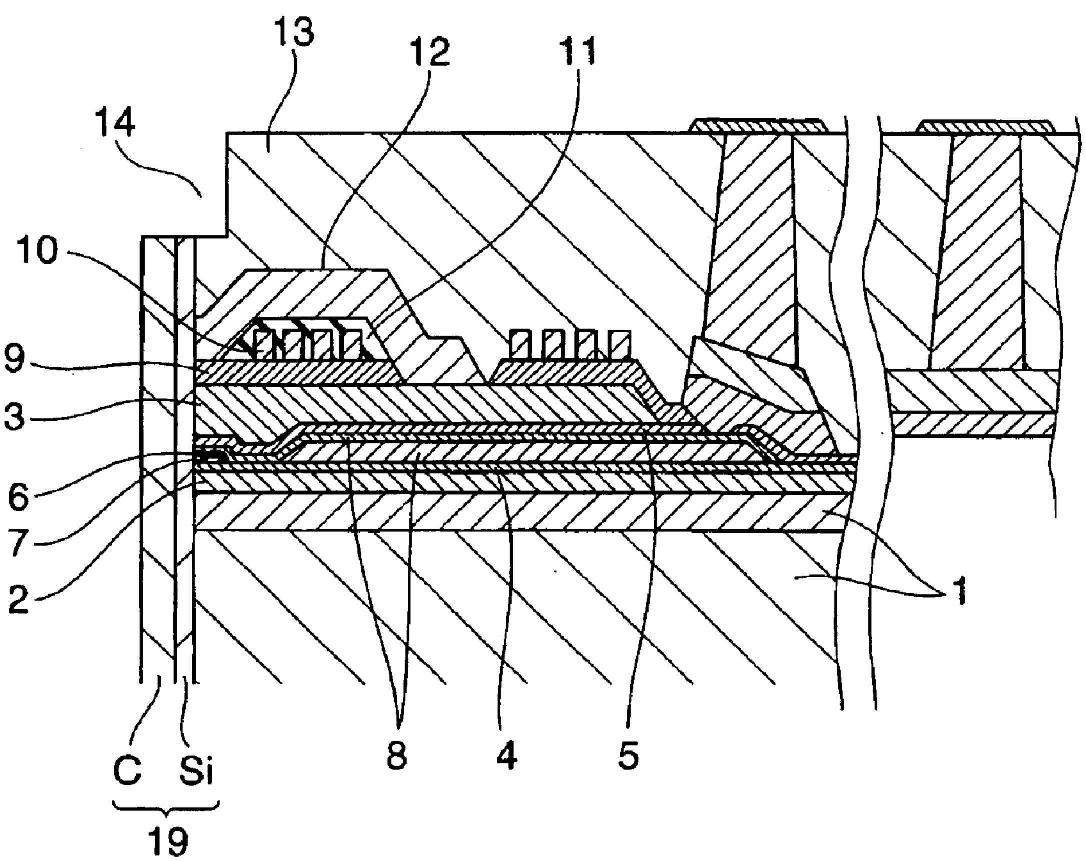
FIG. 6 shows a section of a recording/reproducing separated type magnetic head according to the prior art.
Figure 7:
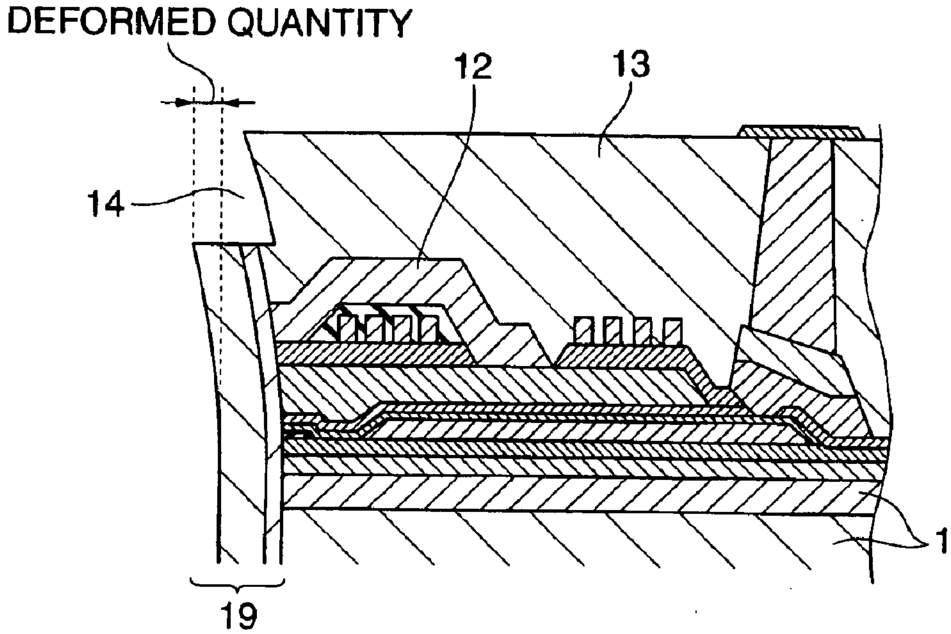
FIG. 7 shows a sectional view of the deformation of the recording/reproducing separated type magnetic head according to the prior art.
Figure 8:
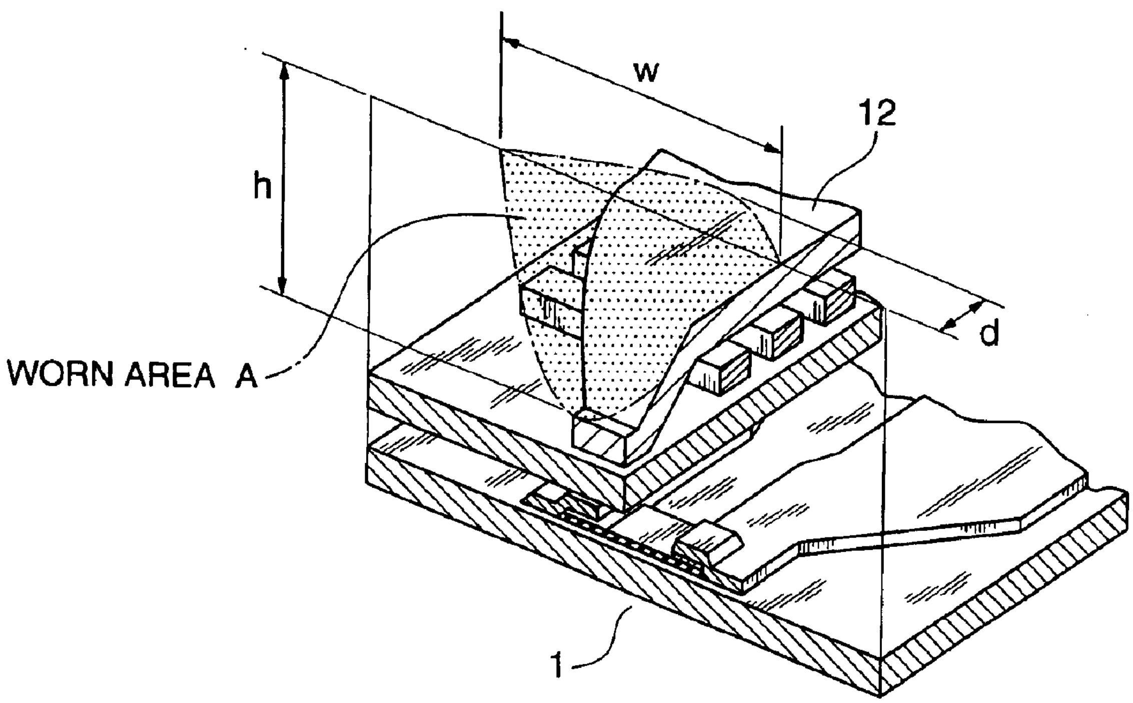
FIG. 8 shows a schematic view of the worn state of the recording/reproducing separated type magnetic head according to the prior art.

While the first embodiment described above is a recording/reproducing separated type magnetic head wherein the upper shield of the read head is also used as the lower magnetic film of the write head, the invention can also be applied to a type where the two elements are separated by an insulating separation film 23 as shown in FIG. 5, and this configuration would give a similar effect to the first embodiment described above. Referring to FIG. 5, the GMR film 7, the hard bias film 6 and the electrode film 8 are formed over the substrate 1 with the lower shield film 2 and a lower gap film (not shown) in-between, and the upper shield film 3, the separation film 23, a lower magnetic film 24, a write gap film (not shown), the coils 10, an interlayer insulator (not shown), the upper magnetic film 12, a protective film (not shown) and a multilayered protective film on the air bearing surface (not shown) are formed with an upper gap film (not shown) in-between. Reference numeral 26 denotes a lower pole protruded by trimming the lower magnetic film 24, and 27, a tip pole of the upper magnetic film 12. A magnetic gap 25, formed of the lower pole 26 and the tip pole 27, determines the write track width. On the air bearing surface is formed the multilayered protective film 19 on the air bearing surface (not shown) as in the first embodiment, the second concave d2 is formed in the protective film over the upper magnetic film 12, again as in the first embodiment, and further the level gap (first concave) d1 of the air bearing surface protective film is formed in the part of the air bearing surface matching the inductive write thin film head. As in the first embodiment, the second concave d2 can be dispensed with.

As hitherto described, by forming a level gap in the part of the multilayered protective film on the air bearing surface matching the inductive write thin film head of the head air bearing surface, it is made possible to provide a recording/reproducing separated type magnetic head in which the protrusion of the head to the air bearing surface due to thermal deformation can be cancelled and, at the same time, the lowest floating point of the read GMR head can be made

What is claimed is:

1. A recording/reproducing separated type magnetic head comprising:

a magnetoresistive head;

an inductive write thin film head arranged adjacent to said magnetoresistive head, having a lower magnetic film, an upper magnetic film and a write gap film and coils both arranged between said lower magnetic film and said upper magnetic film;

a protective film formed in an upper part of said inductive write thin film head;

an air bearing surface protective film formed over air bearing surfaces of said magnetoresistive head and inductive write thin film head; and a first concave portion formed in said air bearing surface protective film in a part matching said inductive write thin film head.

2. The recording/reproducing separated type magnetic head according to claim 1, wherein said air bearing surface protective film is a carbon film.

3. The recording/reproducing separated type magnetic head according to claim 1, wherein said air bearing surface protective film is formed of a multilayered film of at least two layers and said first concave portion is formed by removing an upper layer of said multilayered film.

4. The recording/reproducing separated type magnetic head according to claim 1, wherein said air bearing surface protective film is a multiple layer of a silicon film and a carbon film, and said first concave portion is formed by removing said carbon film.

5. The recording/reproducing separated type magnetic head according to claim 4, wherein an angled portion of said protective film, formed in the upper part of said inductive write thin film head, toward the air bearing surface has a second concave portion.

6. A recording/reproducing separated type magnetic head comprising:

a magnetoresistive head having a magnetoresistive film arranged between a lower shield film and an upper shield film provided over a substrate, and electrode films electrically connected to said magnetoresistive film;

an inductive write thin film head having a write gap film and coils arranged between a lower magnetic film and an upper magnetic film, both provided over said upper shield film of the magnetoresistive head with an insulating film in-between;

a protective film formed in an upper part of said inductive write thin film head;

an air bearing surface protective film formed over air bearing surfaces of said magnetoresistive head and inductive write thin film head; and a first concave portion formed in said air bearing surface protective film in a part matching said upper magnetic film.

7. The recording/reproducing separated type magnetic head according to claim 6, wherein said air bearing surface protective film is a carbon film.

8. The recording/reproducing separated type magnetic head according to claim 6, wherein said air bearing surface protective film is formed of a multilayered film of at least two layers and said first concave portion is formed by removing an upper layer of said multilayered film.

9. The recording/reproducing separated type magnetic head according to claim 6, wherein said air bearing surface protective film is a multiple layer of a silicon film and a carbon film, and said first concave portion is formed by removing said carbon film.

10. The recording/reproducing separated type magnetic head according to claim 9, wherein an angled portion of said protective film, formed in the upper part of said inductive write thin film head, toward the air bearing surface has a second concave portion.

11. A recording/reproducing separated type magnetic head comprising:

a magnetoresistive head having a magnetoresistive film arranged between a lower shield film and an upper shield film provided over a substrate, and electrode films electrically connected to said magnetoresistive film;

an inductive write thin film head using said upper shield film of said magnetoresistive head also as a lower magnetic film and having a write gap film and coils arranged between said upper shield film-cum-lower magnetic film and an upper magnetic film provided over said upper shield film-cum-lower magnetic film;

a protective film formed in an upper part of said inductive write thin film head;

an air bearing surface protective film formed over air bearing surfaces of said magnetoresistive head and inductive write thin film head; and a first concave portion formed in said air bearing surface protective film in a part matching said upper magnetic film of said inductive write thin film head.

12. The recording/reproducing separated type magnetic head according to claim 11, wherein said air bearing surface protective film is a carbon film.

13. The recording/reproducing separated type magnetic head according to claim 11, wherein said air bearing surface protective film is formed of a multilayered film of at least two layers and said first concave portion is formed by removing an upper layer of said multilayered film.

14. The recording/reproducing separated type magnetic head according to claim 11, wherein said air bearing surface protective film is a multiple layer of a silicon film and a carbon film, and said first concave portion is formed by removing said carbon film.

15. The recording/reproducing separated type magnetic head according to claim 14, wherein an angled portion of said protective film, formed in the upper part of said inductive write thin film head, toward the air bearing surface has a second concave portion.

16. A recording/reproducing separated type magnetic head comprising:

a magnetoresistive head having a magnetoresistive film arranged between a lower shield film and an upper shield film provided over a substrate, and electrode films electrically connected to said magnetoresistive film;

an inductive write thin film head having a write gap film and coils arranged between a lower magnetic film having a pole toward the air bearing surface and an upper magnetic film having a pole toward an air bearing surface, both provided over said upper shield film of said magnetoresistive head with an insulating film in-between;

a protective film formed in an upper part of said inductive write thin film head;

an air bearing surface protective film formed over the air bearing surfaces of said magnetoresistive head and inductive write thin film head; and a first concave portion formed in said air bearing surface protective film in a part matching said upper magnetic film of inductive write thin film head.

17. The recording/reproducing separated type magnetic head according to claim 16, wherein said air bearing surface protective film is a carbon film.

18. The recording/reproducing separated type magnetic head according to claim 16, wherein said air bearing surface protective film is formed of a multilayered film of at least two layers and said first concave portion is formed by removing an upper layer of said multilayered film.

19. The recording/reproducing separated type magnetic head according to claim 16, wherein said air bearing surface protective film is a multiple layer of a silicon film and a carbon film, and said first concave portion is formed by removing said carbon film.

20. The recording/reproducing separated type magnetic head according to claim 19, wherein an angled portion of said protective film, formed in the upper part of said inductive write thin film head, toward the air bearing surface has a second concave portion.

21. The recording/reproducing separated type magnetic head according to claim 1, wherein said concave portion is formed in said air bearing surface film in a part matching said upper magnetic film.

22. A recording/reproducing separated type magnetic head comprising:

a magnetoresistive head;

an inductive write thin film head arranged adjacent to said magnetoresistive head, having a lower magnetic film, an upper magnetic film and a write gap film and coils both arranged between said lower magnetic film and said upper magnetic film;

a protective film formed in an upper part of said inductive write thin film head;

an air bearing surface protective film formed over air bearing surfaces of said magnetoresistive head and inductive write thin film head; and a first concave portion formed in said air bearing surface protective film in a part which is at a center of said inductive write thin film head in a width direction.

* * * * *